United States Patent [19]

Kock et al.

[11] Patent Number: 4,801,734
[45] Date of Patent: Jan. 31, 1989

[54] AMPHIPHILIC 4-ALKOXYPOLYETHOXYBENZOATES, THEIR PREPARATION AND THEIR USE

[75] Inventors: Hans-Jakob Kock, Ludwigshafen; Ekhard Winkler; Richard Baur, both of Mutterstadt; Heino Finkelmann; Markus Schafheutle, both of Freiburg i. Br., all of Fed. Rep. of Germany

[73] Assignee: BASF Aktiengesellschaft, Rheinland-Pfalz, Fed. Rep. of Germany

[21] Appl. No.: 66,108

[22] Filed: Jun. 25, 1987

[30] Foreign Application Priority Data

Jul. 2, 1986 [DE] Fed. Rep. of Germany ....... 3622086

[51] Int. Cl.$^4$ ............................................. C07C 69/76
[52] U.S. Cl. .................................. 560/73; 252/299.64
[58] Field of Search ....................... 560/73; 252/299.64

[56] References Cited

PUBLICATIONS

CA 90 (3) 22623r (Jpn Kokai Tokkgo Koho JP 53/87334 Aug. 1, 1978).
CA 79 (16) 97891h Schroeder J. P. et al J. Org. Chem. 38(18) 3160–4 1973.
Mitchell et al, J. Chem. Soc., Faraday Trans. I, 1983, vol. 79, 975–1000.
Lang et al, J. Chem. Phys. vol. 73, 5849–5861, Dec. 1980.
Finkelmann et al, Colloid & Polymer Science, vol. 260, 56–65, 1982.
Lühmann et al, Colloid & Polymer Science, vol. 264, 189–192 (1986).
Lühmann et al, Makromol. Chem., vol. 186, 1059–1073 (1985).

*Primary Examiner*—Paul J. Killos
*Attorney, Agent, or Firm*—Oblon, Fisher, Spivak, McClelland & Maier

[57] ABSTRACT

Nonionic substances which form disk-shaped micelles in aqueous solution and are of the formula

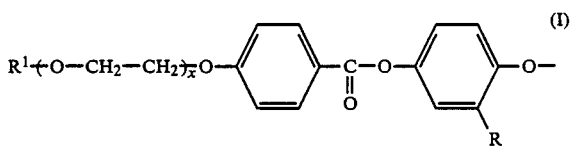
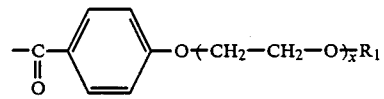

where R is H or

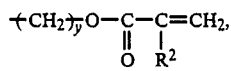

$R^1$ is $C_1$–$C_4$alkyl, $R^2$ is H or $CH_3$, x is from 3 to 12 and y is from 3 to 15, and polymers of compounds of the formula I where R is

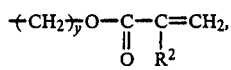

processes for the preparation of the compounds of the formula I and of the polymers, and the use of the compounds described as additives to detergents and cleaning agents, for other surfactant applications and as liquid crystals for optical, electronic and optoelectronic applications.

5 Claims, No Drawings

AMPHIPHILIC 4-ALKOXYPOLYETHOXYBENZOATES, THEIR PREPARATION AND THEIR USE

Amphiphilic compounds composed of hydrophilic and hydrophobic units form, in aqueous systems and above the critical micelle concentration, micellar structures which, in the case of a suitable structure and in certain concentration ranges, are present as liquid crystalline phases (meso phases). These meso phases may consist of spherical, acicular or disk-shaped micelles, and it is also possible for different meso phases to exist in a binary system. The structures of the meso phases can be determined by textural investigations under the polarization microscope. A detailed compilation of texture/structure assignments is given in Textures of Liquid Crystals, Ed. Demus, Richter Verlag Chemie (1978). The literature (Mitchell et al., J. Chem. Soc. Farad. Trans. I 89 (1983), 975 and Lang et al., J. Chem. Phys. 73 (1980), 5849) discloses, for example, the phase behavior and in particular the existence of mesomorphic phases as a function of the balance between hydrophilic and hydrophobic units of nonionic surfactants having the structure $CH_3-(CH_2)_y-(O-CH_2-CH_2)_x-OH$. By a suitable choice of the ratio of x to y, it is possible to produce binary systems of a surfactant and water which have meso phases in a certain temperature range.

H. Finkelmann et al., Colloid & Polymer Sci. 260 (1982), 56–65 reported detailed comparative investigations into monomeric amphiphiles and their polymerized analogs. Because of the improved solubility of the amphiphilic side chain polymers, the miscibility gap in the binary system of surfactant and water is shifted to higher temperatures.

By incorporating rigid hydrophobic units into amphiphilic compounds, Luhmann et al. (cf. Makromol. Chem. 186 (1985), 1059 and Colloid & Polym. Sci. 264 (1986), 189) were able to show that compounds of this type form disk-shaped (diskotic) micelles with water in the binary system, and that there is a lyotropic nematic phase before a liquid crystalline lamellar $L_\alpha$ phase.

The mesomorphic surfactant systems known to date have the disadvantage that they possess a large number of liquid crystalline phases in narrow concentration ranges and, in particular, the nematic phases characterized by their excellent flow properties exist as homogeneous phases only in extremely narrow concentration and temperature ranges. No smectic phases having an $S_c$ structure are known to date.

It is an object of the present invention to provide nonionic amphiphilic compounds which are capable of forming disk-shaped (diskotic) micelles in aqueous solution and have one or more smectic phases.

We have found that this object is achieved, according to the invention, by nonionic 4-alkoxypolyethoxybenzoates of the formula

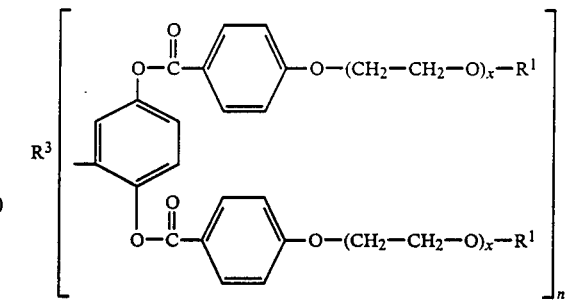

where $R^3$ is an n-valent radical of the formula

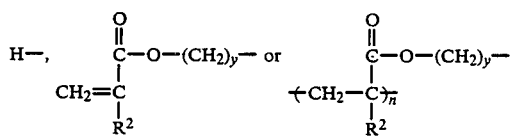

n is 1 or an integer greater than 1, $R^1$ is $C_1$-$C_4$-alkyl, $R^2$ is —H or —$CH_3$, x is from 3 to 12 and y is from 3 to 15.

Novel substances which contain, as $R^3$, a radical of the formula

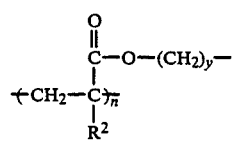

are polymeric compounds. Their formula is reproduced here in the simplified, generally used open form, although these compounds, like the majority of polymeric substances, carry terminal groups at both ends of the polymer chain, as shown in the following schematic formula:

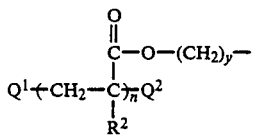

In this formula $Q^1$ and $Q^2$ are each a terminal group, the nature of which is known to depend on the particular polymerization conditions and as a rule is unknown, since it can only be determined by very expensive investigations and is generally not important with regard to the behavior of a polymeric substance. Regarding the problems of terminal groups, see, for example, Houben-Weyl, "Methoden der organischen Chemie", 4th edition, volume 14/1, pages 116–118.

In the novel polymeric substances, n is not less than 2, preferably up to 400; particularly advantageous novel polymeric substances are those in which n is an integer from 20 to 200.

The nonpolymeric substances according to the invention are of the formula

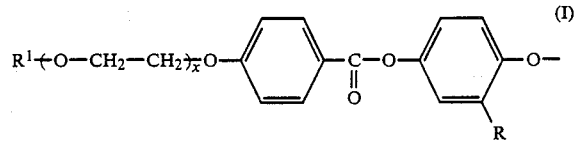  (I)

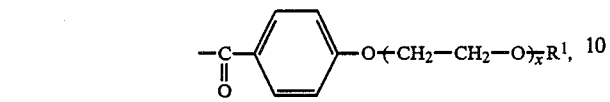

where R is H or

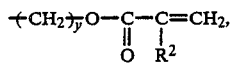

$R^1$ is $C_1$-$C_4$-alkyl, $R^2$ is H or $CH_3$, x is from 3 to 12 and y is from 3 to 15. X may furthermore be a mean degree of oxyethylation, ie. mixtures of compounds of the formula I may be present which have different degrees of oxyethylation, the mean value of x being from 3 to 12.

In the compounds of the formula I, the two groups

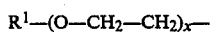

are two hydrophilic wing groups, while the remaining part of the molecule may be regarded as a rigid hydrophobic core. Substances of the formula

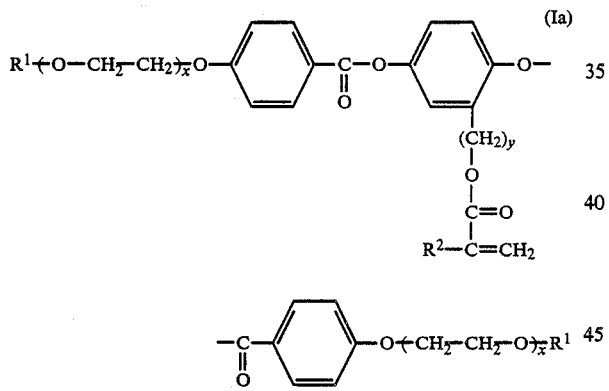

where $R^1$ is $C_1$-$C_4$-alkyl, preferably $CH_3$, $R^2$ is H or $CH_3$, x is from 3 to 12, preferably from 5 to 8, and y is from 3 to 15, preferably from 8 to 12, can be polymerized in the presence of a free radical initiator and, if required, a regulator. This gives the polymeric substances discussed above, in which radicals of the formula I, where R is H, are fixed to the polymer chain in the form of side chains in such a way that the longitudinal molecular axis of the hydrophobic unit of the compound of the formula I is transverse to the linking alkylene chain. Surprisingly, we have found that the compounds of the formula I, which consist of a rigid hydrophobic core and two hydrophilic wing groups, produce exclusively a defined micelle geometry in the binary system with water, ie. disk-shaped (diskotic) micelles whose size (thickness) can be adjusted in a controlled manner by the choice of the hydrophobic unit. In certain concentration ranges, these micelles exclusively form lyotropic smectic phases. Furthermore, the polymeric nonionic substances obtainable by polymerization of the compounds of the formula Ia have liquid crystalline phases in the binary system of surfactant and water.

The compounds of the formula I are obtained, for example, by a multistage reaction in which a compound of the formula

  (II)

where $R^1$ is $C_1$-$C_4$-alkyl, preferably $CH_3$, x is from 1 to 12 and Hal is Cl, Br or I, is first reacted with a $C_1$-$C_4$-alkyl 4-hydroxybenzoate with elimination of halogen in the presence of a base to give a compound of the formula

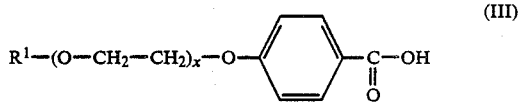  (III)

Suitable 4-hydroxybenzoates are, for example, the methyl, ethyl, isopropyl, n-propyl, isobutyl and n-butyl esters of 4-hydroxybenzoic acid. Methyl 4-hydroxybenzoate is preferably used. Particularly suitable bases are sodium hydroxide solution, potassium hydroxide solution and alkali metal alcoholates. The reaction can be carried out in the absence of a solvent or in a solvent such as dioxane, water, methanol or dimethyl sulfoxide. The compounds of the formula III are converted to the corresponding acyl chloride or acyl bromide of the formula

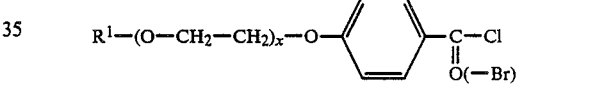  (IV)

which is then reacted with a compound of the formula

  (V)

where R is H or

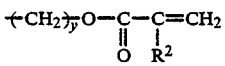

$R^2$ is H or $CH_3$, preferably $CH_3$, and y is from 3 to 15, preferably from 8 to 12.

The reaction is carried out in the presence of a tertiary amine, eg. pyridine, triethylamine or tributylamine, and preferably in a solvent such as dioxane, tetrahydrofuran or dichloromethane. Solutions of nonionic surfactants of the formula I are obtained, from which the compounds of the formula I can be isolated by evaporating off the solvent. If necessary, purification is carried out beforehand, for example chromatography over silica gel.

However, it is also possible, for example, to react 4-hydroxybenzoic acid or one of its esters, its chloride or its bromide in a conventional manner with half the molar amount of a compound of the formula V to give an ester of the formula

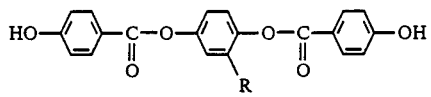

and then to react this in a conventional manner, at the terminal hydroxyl groups, with ethylene oxide in an amount such that the mean degree of oxyethylation of each polyglycol chain has the value x, and to react the resulting oxyethylation product in a conventional manner with an agent which introduces the radical $R^1$, for example an alkyl chloride $R^1$—Cl, or with dimethyl sulfate, to give a substance according to the invention.

It is also possible, for example, first to react the $C_1$-$C_4$-alkyl 4-hydroxybenzoate with ethylene oxide to give an oxyethylation product of the formula

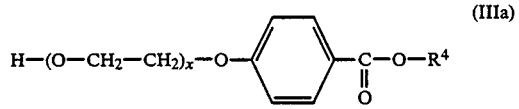
(IIIa)

where $R^4$ is $C_1$-$C_4$-alkyl, to introduce the radical $R^1$, as stated above, into this product to give a product of the formula

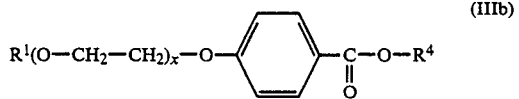
(IIIb)

and then to convert this to a novel substance by reaction with a compound of the formula V.

The compounds of the formula Ia contain an ethylenically unsaturated double bond and can therefore be polymerized. The polymerization is initiated using initiators which decompose to give free radicals under the polymerization conditions. Suitable initiators are the peroxides usually employed in polymerizations, hydroperoxides, hydrogen peroxide and azo compounds, such as azobisisobutyronitrile, and in particular water-soluble azo compounds, eg. 2,2'-azobis-(2,4-dimethylvaleronitrile), 2,2'-(N,N'-dimethylisobutyramidine), 4,4-azobis-(4-cyanopentanecarboxylic acid) and 2,2'-azobis-(2,4-dimethylvaleronitrile). Other useful polymerization initiators are the redox initiators usually suitable for polymerizations. The initiators are used in the conventional amounts, for example in an amount of 0.05 to 1.0% by weight, based on the compound of the formula Ia. The polymerization is preferably carried out at from 0° to 60° C. A conventional regulator, such as dodecylmercaptan, mercaptoethanol, thioacetic acid or hydroxylammonium sulfate, may also be present. The polymerization can in principle be carried out by the known methods of solution polymerization, reverse suspension polymerization and water-in-oil polymerization. The polymers can be isolated in pure form after the solvent has been removed. The degree of polymerization of the polymers is usually from 2 to 400, preferably from 20 to 200 (determined by gel permeation chromatography on commodity polystyrene using tetrahydrofuran). The compounds of the formula I and the polymers obtainable by polymerization of compounds of the formula Ia are nonionic substances which form disk-shaped (diskotic) micelles in aqueous solution and have one or more smectic phases. Both the monomers and the polymers can be used in detergent or cleaning agent formulations to reinforce the washing power. Amounts suitable for this purpose are from 0.1 to 10% by weight, based on the detergent or cleaning agent formulation. They can also be used as surface-active additives for a very wide variety of surfactant applications, for example in electroplating baths, in the production of printed circuit boards for the electronics industry and in pesticide formulations. They can also advantageously be used for a very wide range of optical, electronic and optoelectronic applications.

In the Examples, parts and percentages are by weight.

EXAMPLE 1

Preparation of the benzoate of the formula

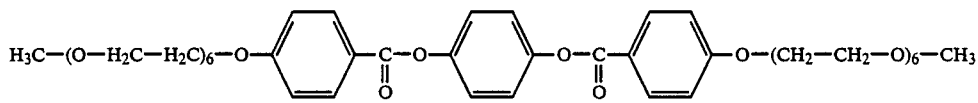
(6)

(a) 101.16 g ($\approx$0.6 mole) of 3,6,9-trioxadecanol are reacted with 44.6 ml ($\approx$0.6 mole) of thionyl chloride and 51.7 ml ($\approx$0.64 mole) of pyridine in a tetrahydrofuran solution by refluxing for 12 hours to give 3,6,9-trioxadecyl chloride $$H_3C\text{-}[OCH_2CH_2]_3Cl \quad (1)$$

The mixture is cooled and then extracted several times with methyl ethyl ketone (MEK), and the MEK phase is then neutralized with $NaHCO_3$ and dried over $Na_2SO_4$. After the MEK has been removed, the residue is distilled under 30 Pa and at 30°-37° C. Yield: 90%.

(b) First, 160 g ($\approx$1.05 moles) of 3,6-dioxaoctane-1,8-diol are reacted with 11.6 g ($\approx$0.5 mole) of sodium at 110° C. in the course of 12 hours to give the monoalcoholate. During the reaction, the mixture is stirred thoroughly. Thereafter, potassium iodide is added as a catalyst, and 91.9 g ($\approx$0.5 mole) of the compound (1) are introduced dropwise in the course of from 4 to 5 hours into the reaction mixture kept at 110° C. When the addition of compound (1) is complete, the reaction mixture is stirred for a further 64 hours at 160° C. and then cooled to room temperature, filtered and fractionated. The compound of the formula $$H_3C\text{—}[O\text{—}CH_2\text{—}CH_2]_6OH \quad (2)$$

ie. 3,6,9,12,15,18-hexaoxanonadecanol, distills off under 60 Pa and at 150°-160° C.

(c) 39 g ($\approx$0.143 mole) of the compound (2) are chlorinated with 10.1 ml ($\approx$0.139 mole) of thionyl chloride in 11.5 ml ($\approx$0.143 mole) of pyridine, similarly to the synthesis of the compound (1), to give the compound of the formula $$H_3C-[O-CH_2-CH_2]_6-Cl \quad (3)$$

(d) 21.8 g of methyl 4-hydroxybenzoate and 6 ml ($\approx$0.148 mole) of methanol are added to a solution of 8.05 g ($\approx$0.143 mole) of potassium hydroxide in 55 ml of water. The solution is then added, while stirring, to a mixture of 45 g ($\approx$0.143 mole) of the compound of the formula (3) and a catalytic amount of potassium iodide, and the mixture is refluxed for 12 hours. After some time, phase separation occurs. In order to complete the reaction, 11.5 g of KOH are added to the reaction mixture, and the mixture is refluxed for 4 days. During this procedure, the phase separation vanishes. The reaction mixture is acidified to pH 1 by adding hydrochloric acid, and is extracted several times with MEK. The MEK is then distilled off from the extract. The remaining oily residue is recrystallized twice from diethyl ether at $-16°$ C. and dried over phosphorus pentoxide under reduced pressure. 40.5 g (65.5% yield) of a pale yellowish substance of the formula

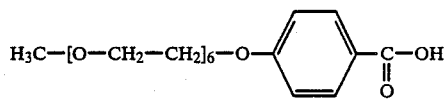
(4)

are obtained. The melting point is 38°-39° C.

(e) 3 g ($\approx$0.007 mole) of the compound (4) are dissolved in 5 ml ($\approx$0.07 mole) of thionyl chloride, and the solution is refluxed for 5 hours with dimethylformamide as a catalyst. Thereafter, the residual thionyl chloride is distilled off and the residue is distilled under 100 Pa and at 225°-226° C. 2.07 g (65.5% yield) of the acyl chloride of the formula

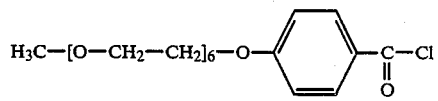
(5)

are obtained.

(f) 2.05 g ($\approx$0.0045 mole) of the compound of the formula (5), dissolved in 1 ml of anhydrous methylene chloride, are added dropwise to a solution of 258.8 mg ($\approx$0.0024 mole) of hydroquinone and 0.66 ml ($\approx$0.0048 mole) of triethylamine in 5 ml of anhydrous methylene chloride at $-20°$ C. The mixture is stirred for 2 days at room temperature. Thereafter, the methylene chloride is removed and the residue is chromatographed over commercial silica gel having a particle size of 60-63 $\mu$m, using a 1:2 mixture of ether and acetone. The solid product of the formula (6), which has a melting point of 19.8° C., is obtained in a yield of 75%.

In benzoate (6)/H$_2$O binary systems, micelles form in dilute solution, the critical micelle formation concentration (c.m.c.) being determined by measuring the surface tension (Table 1).

TABLE 1

| c.m.c. of the surfactant (6) in H$_2$O |
|---|
| c.m.c. (% by weight) |
| 10° C. 8.15 · 10$^{-2}$ |
| 20° C. 6.46 · 10$^{-2}$ |

TABLE 1-continued

| c.m.c. of the surfactant (6) in H$_2$O |
|---|
| c.m.c. (% by weight) |
| 30° C. 5.63 · 10$^{-2}$ |

Investigation of the lyotropic phase behavior

A polarization microscope with a means for heating the sample is particularly suitable for investigating the lyotropic phase behavior of amphiphiles, since it allows phase transitions to be determined and optically monitored at the same time. The contact preparation is used for preliminary investigations and for determining whether, or what, mesophases occur in a surfactant/water system.

(a) Contact preparations

For this purpose, a small amount of each of the compounds to be investigated is introduced onto a microscope slide, and a cover glass is placed on top so that one of its edges rests on a second cover glass positioned laterally with respect to the sample. A drop of water is introduced between the slanting cover glass and the slide. The water flows around the amphiphilic compound and, in the course of time, the concentration gradient from pure water to the amphiphile forms as a result of diffusion. The preparation is placed on a heating stage located in the beam of a polarization microscope. The phase transition can be observed by heating or cooling under the microscope; the heating rate chosen should be no higher than 1° C./min.

(b) Recording of a phase diagram using defined mixtures

To record a phase diagram, various surfactant/water mixtures are prepared and are investigated as a function of temperature.

Since, because of its low viscosity, the sample readily spreads out between the slide and the cover glass, a sufficiently thick sample layer should be maintained between these by means of spacers. For the preparation, 50 mg samples of various compositions in percentage by weight of surfactant and water are weighed into small cylindrical teflon chambers on an analytical balance. A stainless steel ball is introduced, and a homogeneous mixture is then produced using a vibratory mill. Some of the mixture is then placed on a slide, on which small pieces of a heat-resistant foil (eg. commercial backing foil) have been placed beforehand as spacers. A cover glass is placed on top, and the sample is then sealed in using a solvent-free epoxy resin in order to prevent loss of water during heating. The investigation is once again carried out on a heating stage under a polarization microscope.

In the range from 53 to 84% by weight of benzoate (6), the binary sysgtem of the benzoate (6) and water exhibits smectic phases over a temperature range from 8.7° to 33.5° C. The homogeneous smectic phases exist in the range from 54–75% by weight of benzoate (6) and from 8.7° to 28° C. The fact that the phase formed at high temperatures is a smectic S$_c$ phase is of particular importance in this context. This phase has been unknown to date for lyotropic liquid crystals.

EXAMPLE 2

Preparation of the benzoate of the formula

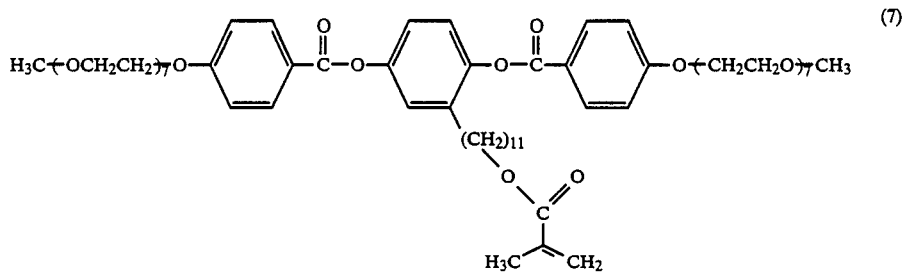
(7)

The tetraethylene glycol dichloride

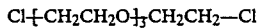
(8)

is prepared from tetraethylene glycol and SOCl₂, using a process similar to that described in Example 1, and the product is then reacted with the monosodium salt of triethylene glycol monomethyl ether to give the compound of the formula

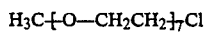
(9)

Reacting (9) with methyl 4-hydroxybenzoate gives the compound of the formula

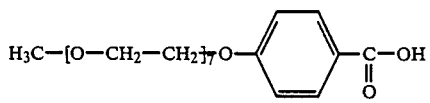
(10)

which is converted with thionyl chloride to the corresponding acyl chloride of the formula

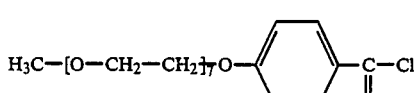
(11)

To synthesize (7), the procedure described by F. Hessel and H. Finkelmann, Polym. Bull. 14 (1985), 375 is followed, and quinone is converted via the hydrogen bromide adduct of methyl undecenoate to the corresponding hydroquinone derivative of the formula

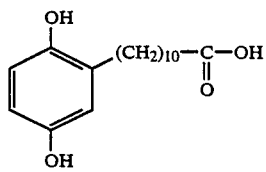
(12)

which is reduced with LiAlH₄ to the alcohol derivative

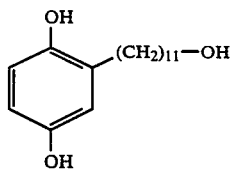
(13)

and then esterified with methacrylic acid to give the compound of the formula

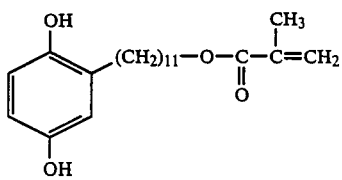
(14)

Reacting (11) with (14) gives the benzoate of the above formula (7). For this purpose, 3 moles of (11) are reacted with 1 mole of (14) and 3 moles of pyridine in dichloromethane at below 0° C. Purification by column chromatography gives the benzoate of the formula (7) in a yield of 75%.

In the binary system of the benzoate (7) and water, a homogeneous smectic phase forms in a wide concentration range. At low surfactant concentrations in aqueous solution, a smectic phase coexists with a highly dilute isotropic micellar solution at above the freezing point of water. At high surfactant concentrations, the smectic phase coexists with a concentrated isotropic micellar surfactant solution. Below 0° C., ice coexists with the smectic phase.

EXAMPLE 3

The benzoate (7) described in Example 2 is dissolved in tetrahydrofuran to give a solution having a solids content of 23%, and 0.19 mol %, based on benzoate (7), of azobisisobutyronitrile is added. The reaction mixture is stirred, heated to 60° C. and kept at this temperature for 18 hours. Thereafter, the polymer is precipitated with hexane and then dried under reduced pressure.

The contact preparation exhibits a lamellar smectic phase which exists in the range from −12.9° to 41.8° C.

We claim:
1. A 4-alkoxypolyethoxybenzoate forming lyotropic liquid crystals, of the formula

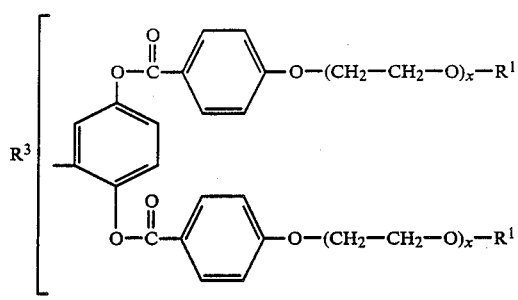

where R³ is an n-valent radical of the formula

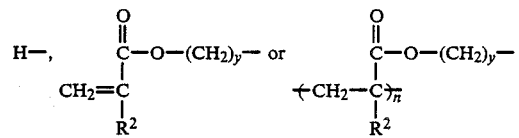

n is 1 or an integer greater than 1, R¹ is $C_1$–$C_4$-alkyl, R² is —H or —$CH_3$, x is from 3 to 12 and y is from 3 to 15.

2. A substance as claimed in claim 1, wherein n is an integer from 2 to 400.

3. A substance as claimed in claim 1, wherein n is an integer from 20 to 200.

4. A substance as claimed in claim 1, of the formula I

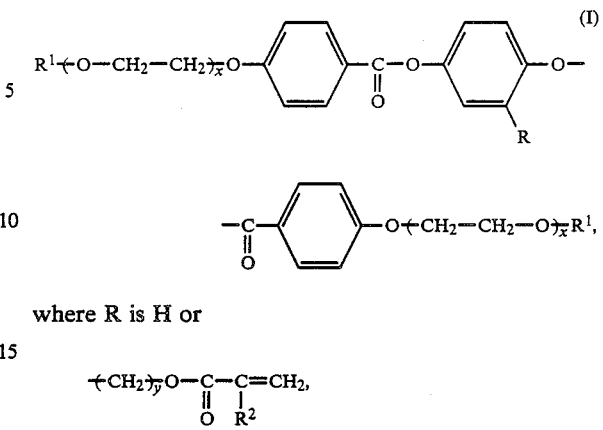

where R is H or

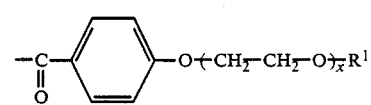

R¹ is $C_1$–$C_4$-alkyl, R² is H or $CH_3$, x is from 3 to 12 and y is from 3 to 15.

5. A substance as claimed in claim 1, of the formula Ia

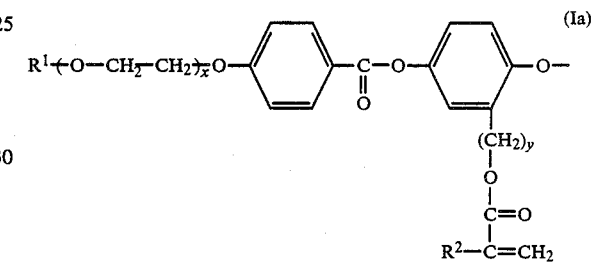

where R¹ is $C_1$–$C_4$-alkyl, R² is H or $CH_3$, x is from 3 to 12 and y is from 3 to 15.

* * * * *